(12) United States Patent
Philips (10) Patent No.: US 7,372,888 B1
(45) Date of Patent: May 13, 2008

(54) METHOD AND APPARATUS FOR SOFTWARE RECONFIGURABLE COMMUNICATION TRANSMISSION/RECEPTION AND NAVIGATION SIGNAL RECEPTION

(75) Inventor: Lleven Philips, Aarschot (BE)

(73) Assignee: Agilent Technologies Inc., Santa Clara, CA (US)

(*) Notice: Subject to any disclaimer, the term of this patent is extended or adjusted under 35 U.S.C. 154(b) by 0 days.

(21) Appl. No.: 09/568,599

(22) Filed: May 10, 2000

Related U.S. Application Data (60) Provisional application No. 60/133,329, filed on May 10, 1999.

(51) Int. Cl.
*H04B 1/00* (2006.01)

(52) U.S. Cl. .................................................... 375/130

(58) Field of Classification Search ........ 375/130–153, 375/343, 354, 316, 219, 259, 260, 267, 295; 342/357.09, 352, 357.06, 357.12; 455/575, 455/132, 143

See application file for complete search history.

(56) References Cited

U.S. PATENT DOCUMENTS

| | | | |
|---|---|---|---|
| 4,291,409 A | 9/1981 | Weinberg et al. | |
| 4,761,778 A | 8/1988 | Hui | |
| 4,817,146 A | 3/1989 | Szczutkowski et al. | |
| 5,345,472 A | 9/1994 | Lee | |
| 5,406,570 A | 4/1995 | Berrou et al. | |
| 5,511,067 A | 4/1996 | Miller | |
| 5,559,828 A | 9/1996 | Armstrong et al. | |
| 5,606,575 A | 2/1997 | Williams | |
| 5,675,609 A | 10/1997 | Johnson | |
| 5,734,962 A | 3/1998 | Hladik et al. | |
| 5,742,637 A | 4/1998 | Kanterakis et al. | |
| 5,812,607 A | 9/1998 | Hutchinson et al. | |
| 5,825,327 A * | 10/1998 | Krasner | 342/357.09 |
| 5,950,127 A * | 9/1999 | Nitta et al. | 455/428 |

(Continued)

FOREIGN PATENT DOCUMENTS

EP    0 511 139 A1    10/1992

(Continued)

OTHER PUBLICATIONS

Berrou et al., *Near Shannon Liimit Error—Correcting Coding and Decoding: Turbo-Codes* (1), Proceedings of the ICC93, Geneva, Switzerland, May 23-26, 1993.

(Continued)

*Primary Examiner*—Sam K. Ahn (57) ABSTRACT

The method and device performs spread spectrum based communication and/or navigation. Device embodiments may include a receiver having a plurality of programmable tracking units and a processor in communication with the receiver to control the device, such as reconfiguration of the device from one mode to another mode. The tracking units are programmable in a navigation mode to receive and process the satellite navigation signals or in a communication mode to receive and process the spread spectrum based communication signals. When the receiver is configured to track navigation signals, operation may include acquiring the tracked navigation signals, synchronizing the tracking units, obtaining correlation data from a set of correlators, determining pseudo-ranges based on the correlation data, and determining a position fix based on the pseudo-ranges. The communication mode may include implementing multi-code transmission via a plurality of spreaders, where each spreader produces a multi-code signal, and demodulating the multi-code signal via multiple slaved tracking units.

25 Claims, 5 Drawing Sheets

U.S. PATENT DOCUMENTS

| | | | |
|---|---|---|---|
| 5,982,807 A | | 11/1999 | Snell |
| 5,995,537 A | | 11/1999 | Kondo |
| 6,009,325 A | | 12/1999 | Retzer et al. |
| 6,081,697 A | | 6/2000 | Haartsen |
| 6,097,974 A | * | 8/2000 | Camp, Jr. et al. ............ 455/575 |
| 6,108,317 A | | 8/2000 | Jones et al. |
| 6,122,291 A | | 9/2000 | Robinson et al. |
| 6,125,266 A | | 9/2000 | Matero et al. |
| 6,141,373 A | | 10/2000 | Scott |
| 6,208,292 B1 | * | 3/2001 | Sih et al. ................ 342/357.12 |
| 6,208,844 B1 | * | 3/2001 | Abdelgany .................... 455/82 |
| 6,219,341 B1 | | 4/2001 | Varanasi |
| 6,252,917 B1 | | 6/2001 | Freeman |
| 6,272,168 B1 | | 8/2001 | Lomp et al. |
| 6,282,184 B1 | | 8/2001 | Lehman et al. |
| 6,307,877 B1 | | 10/2001 | Philips et al. |
| 6,317,422 B1 | | 11/2001 | Khaleghi et al. |
| 6,324,159 B1 | | 11/2001 | Mennekens et al. |
| 6,351,236 B1 | * | 2/2002 | Hasler ................... 342/357.09 |
| 6,359,940 B1 | * | 3/2002 | Ciccarelli et al. ........... 375/316 |
| 6,370,669 B1 | | 4/2002 | Eroz et al. |
| 6,373,831 B1 | | 4/2002 | Secord et al. |
| 6,400,314 B1 | * | 6/2002 | Krasner ................. 342/357.09 |
| 6,411,661 B1 | | 6/2002 | Nguyen et al. |
| 6,480,529 B1 | * | 11/2002 | Sih et al. ..................... 375/152 |
| 6,542,558 B1 | | 4/2003 | Schulist et al. |
| 6,549,784 B1 | | 4/2003 | Kostic et al. |
| 6,563,856 B1 | | 5/2003 | O'Shea et al. |
| 6,580,921 B1 | * | 6/2003 | Inoue et al. ............. 455/552.1 |
| 6,597,727 B2 | | 7/2003 | Philips et al. |
| 6,614,834 B1 | * | 9/2003 | Meng et al. ................ 375/149 |
| 6,748,010 B1 | | 6/2004 | Butler et al. |
| 6,898,233 B2 | | 5/2005 | Philips et al. |
| 2001/0003530 A1 | | 6/2001 | Sriram et al. |
| 2002/0064142 A1 | | 5/2002 | Antonio et al. |

FOREIGN PATENT DOCUMENTS

| | | |
|---|---|---|
| EP | 0 820 159 A2 | 1/1998 |
| EP | 0 928 084 A2 | 7/1999 |
| FR | 2 675 968 | 10/1992 |
| WO | WO 96/38993 | 12/1996 |

OTHER PUBLICATIONS

Corazza et al., *Probability of Error in the Return Link of a CDMA Mobile Satellite System*, IEEE, pp. 1293-1297, 1996.

DaSilva et al., *Performance of orthogonal CDMA codes for quasi-synchronous communication systems*, Aug. 1993, Universal Personal Communications, vol. 2, pp. 995-999.

De Gaudenzi, *Signal Recognition and Signature Code Acquisition in CDMA Mobile Packet Communications*, pp. 196-208, IEEE Transactions on Vehicular Technology, vol. 47, No. 1, 1998.

Esmailzadeh, R. et al., *Quasi-synchronous time division duplex CDMA*, 1994, IEEE GLOBCOM '94, vol. 3, pp. 1673-1641.

Ojanpera, *Wideband CDMA for Third Generation Mobile Communications*, Artech House Publishers, 1998, pp. 114-115.

Sirius Communications Press Releases, CDMAX: Sirius Announces World's First Software-Configurable W-CDMA Core for Third Generation Wireless Handsets and Base Stations, Jun. 14, 1999, www.sirius.com.

Van Wyk et al., *Performance Tradeoff Among Spreading, Coding and Multiple-Antenna Transmit Diversity for High Capacity Space-Time Coded DS/CDNA*, IEEE, 1999.

* cited by examiner

METHOD AND APPARATUS FOR SOFTWARE RECONFIGURABLE COMMUNICATION TRANSMISSION/RECEPTION AND NAVIGATION SIGNAL RECEPTION

This application claims the benefit of U.S. Provisional Application No. 60/133,329, filed May 10, 1999.

FIELD OF THE INVENTION

The invention relates to the combined use of navigation and communication with a single device.

STATE OF THE ART

Both navigation and mobile data communication are currently domains where a lot of new applications become technically feasible. Currently, navigation and data communications are being combined in a hybrid way, e.g. by interfacing a GPS receiver module to a GSM cellular phone modem. The drawbacks of such a hybrid approach are the limited coverage of the terrestrial network, and the size and cost of the physical realization.

Relevant prior art is discussed in:
(1) Philips et al., U.S. Pat. No. 5,872,810: "Programmable Modem Apparatus for Transmitting and Receiving Digital Data, Design Method and Use Method of Said Modem", filed Jan. 26, 1996, which is incorporated herein by reference.
(2) Philips et al., U.S. patent application Ser. No. 08/592,700 (US): "Programmable Modem Apparatus for Transmitting and Receiving Digital Data, Design Method and Use Method of Said Modem", continuation, filed Jan. 26, 1996, which is incorporated herein by reference.
(3) Philips et al., Patent Application EP-0767544-A2 (EU): "Programmable Modem Apparatus for Transmitting and Receiving Digital Data, Design Method and Use Method of Said Modem", filed Oct. 3, 1996, which is incorporated herein by reference.
(4) De Gaudenzi et al., U.S. Pat. No. 5,327,467: "Code Distribution Multiple Access Communication System with User Voice Activated Carrier and Code Synchronization," filed May 30, 1991, which is incorporated herein by reference.
(5) De Gaudenzi et al., U.S. Pat. No. 5,327,455: "Method and Device for Multiplexing Data Signals," filed Jul. 9, 1993, which is incorporated herein by reference.
(6) R. De Gaudenzi, C. Elia and R. Viola, "Bandlimited quasi-synchronous CDMA: A novel access technique for mobile and personal communication systems," IEEE Selected Areas in Communications, vol. 10, no. 2, pp. 328-348, February 1992.

SUMMARY OF THE INVENTION

The present invention relates to an apparatus for performing spread spectrum-based communication and navigation, said apparatus comprising: a plurality of programmable tracking units, a receiver comprising means for receiving spread spectrum-based communication signals and means for receiving satellite navigation signals, and a processor to control said apparatus, characterized in that said tracking units are programmable in a navigation mode to receive and process said satellite navigation signals or in a communication mode to receive and process said spread spectrum-based communication signals. Said apparatus can be further characterized in that said processor is arranged to control the reconfiguration of a tracking unit from the navigation mode to the communication mode and vice versa.

Preferably, the programmable tracking units comprise: a controllable carrier frequency, controllable time tracking means, programmable scrambling code generators arranged for descrambling, programmable PN code generators, and a plurality of despreaders.

Said spread spectrum-based communication signals are preferably W-CDMA signals, advantageously selected from the group consisting of UMTS/FDD, UMTS/TDD, CDMA2000 and S-UMTS.

The apparatus can be further characterized in that said navigation signals are selected from the group of Galileo, GPS and GLONASS signals.

In a preferred embodiment, the apparatus of the present invention can have at the same time a first part of said plurality of programmable tracking units being programmed in navigation mode and a second part of said plurality of programmable tracking units being programmed in communication mode.

A second aspect of the present invention concerns a method for performing spread spectrum-based communication and navigation with a single device, comprising the steps of:
Operation of the device in communication mode;
Reconfiguration of the receiver of the device for tracking navigation signals;
Acquisition the navigation signals;
Synchronization of the receiver's tracking units;
Dumping the correlation data of the pseudo-range measurements;
Determination of the position fix; and
Reconfiguration to communication mode.

Preferably, said method is controlled in the device by a processor.

In a preferred embodiment, only part of the plurality of tracking units is configured in navigation mode, and the communication mode is operated jointly with the navigation mode.

Advantageously, for the acquisition of the navigation signals, the matched filter that is used for acquisition of the communication signal is re-used.

The method of the present invention can be further characterized in that the communication mode is realized as:
A plurality of spreaders to implement multi-code transmission;
A plurality of slaved tracking units for demodulation of the multi-code signal;
The method of the present invention can also be further characterized in that the communication mode is realized as:
A plurality of spreaders to implement n-bit to $2^n$ PN codes symbol-mapping transmission;
A plurality of slaved tracking units for demodulation of the symbol-mapped signal.

Yet another embodiment of the present invention is a computer program comprising program code means for performing some of the steps of the method of the present invention as described here above when said program is run on a computer. Said computer program code means can be stored as a computer program product on a computer readable medium. Said computer program can be used to implement some of the steps of the method of the invention on e.g. a portable computer system, which comprises receiving means connected e.g. at one of the communication ports of said computer.

DETAILED DESCRIPTION OF THE INVENTION

The following acronyms are used in this patent application:

ARM: Advanced Risc Machine
CDMA: Code Division Multiple Access
CA: Coarse Acquisition code
DLL: Delay Locked Loop
EGNOS: European Global Navigation Orbiting system
ESTEC: European Space Agency—Technology Centre
FDM: Frequency Division Multiplexing
FDMA: Frequency Division Multiple Access
GLONASS: GLObal NAvigation Satellite System
GNSS: Global Navigation Satellite System
GPS: Global Positioning System
GSM: Global System for Mobiles
IF: Intermediate Frequency
MAI: Multiple Access Interference
NCO: Numerically controlled Oscillator
PN: Pseudo Noise
QPSK: Quadrature Phase Shift Keying
QS-CDMA: Quasi Synchronous CDMA
RAM: Random Access Memory
RRC: Rooted Raised Cosine
S-CDMA: Synchronous CDMA
TBC: To Be Confirmed
TBD: To Be Defined
WAAS: Wide Area Augmentation System
W-CDMA: Wideband CDMA The reception and the processing of the navigation signals, and 2-way spread spectrum-based data communication (both terrestrial and via satellite) can be seen as exclusive or partially exclusive tasks, or at least they can be time-multiplexed to a certain extent. Moreover, waveforms for satellite-based data communications are defined such that they have operators in common with the GPS, GLONASS, GNSS-1 (EGNOS, WAAS, etc.) and GNSS-2 (GPS and Galileo) waveform definitions.

The invention will be illustrated using several non-limiting examples and figures.

The basic baseband architecture of a combined navigation and communication transceiver consists of a CDMA-based (direct sequence spread spectrum) transmitter, a flexible multiple CDMA-based receiver, and a microprocessor subsystem.

Figure 1:
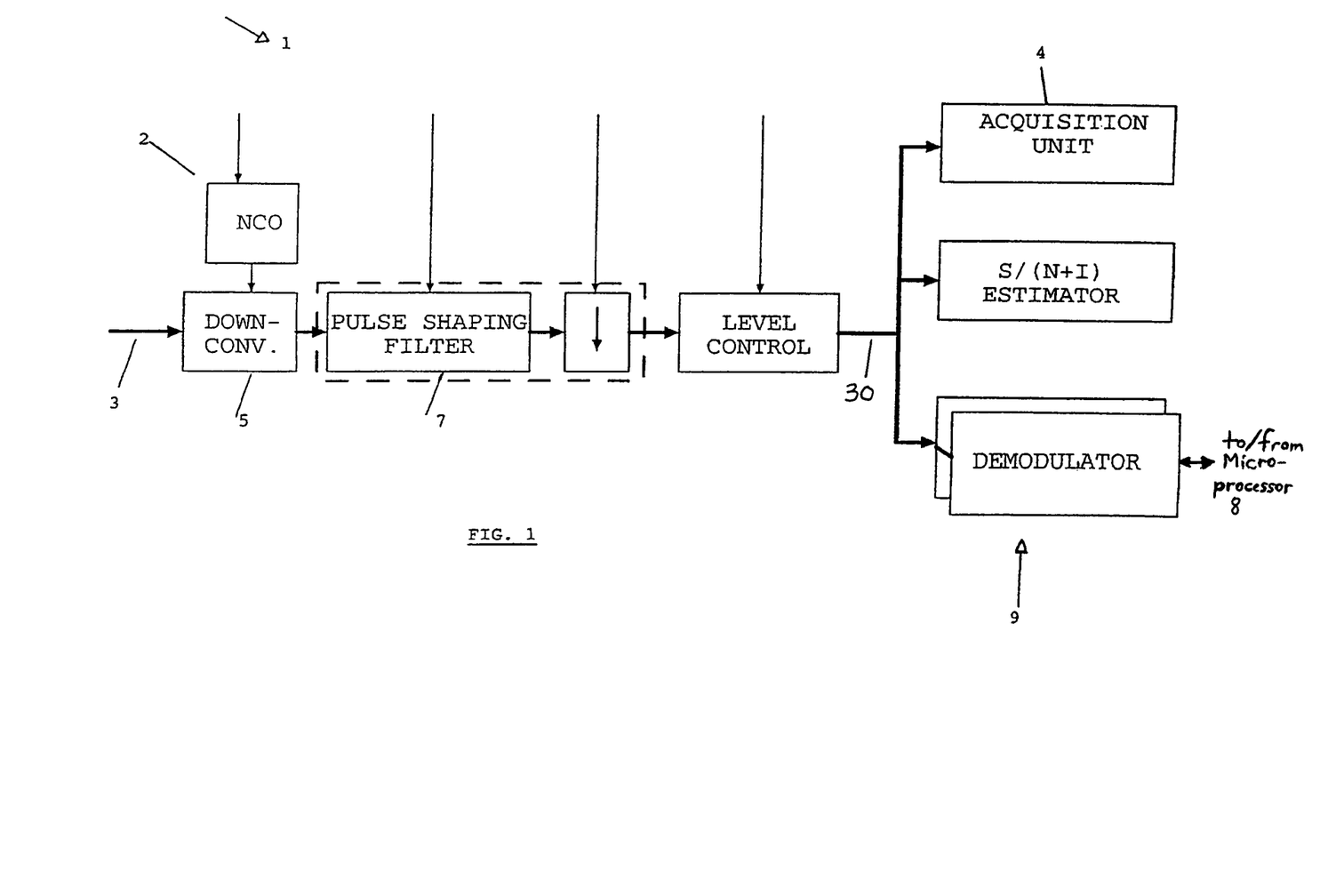
FIG. 1 describes a receiver architecture.
Figure 2:
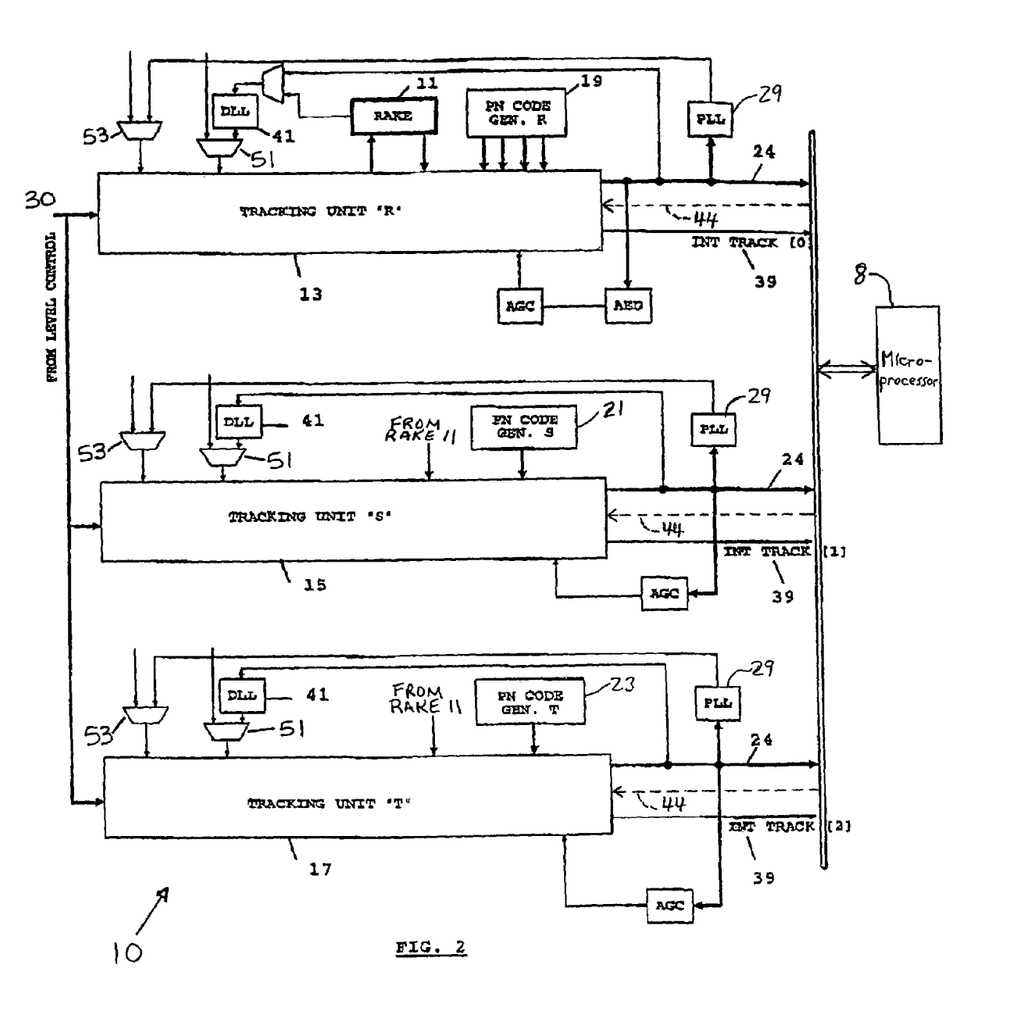
FIG. 2 shows a demodulator architecture switched for communication and navigation reception.
Figure 3:
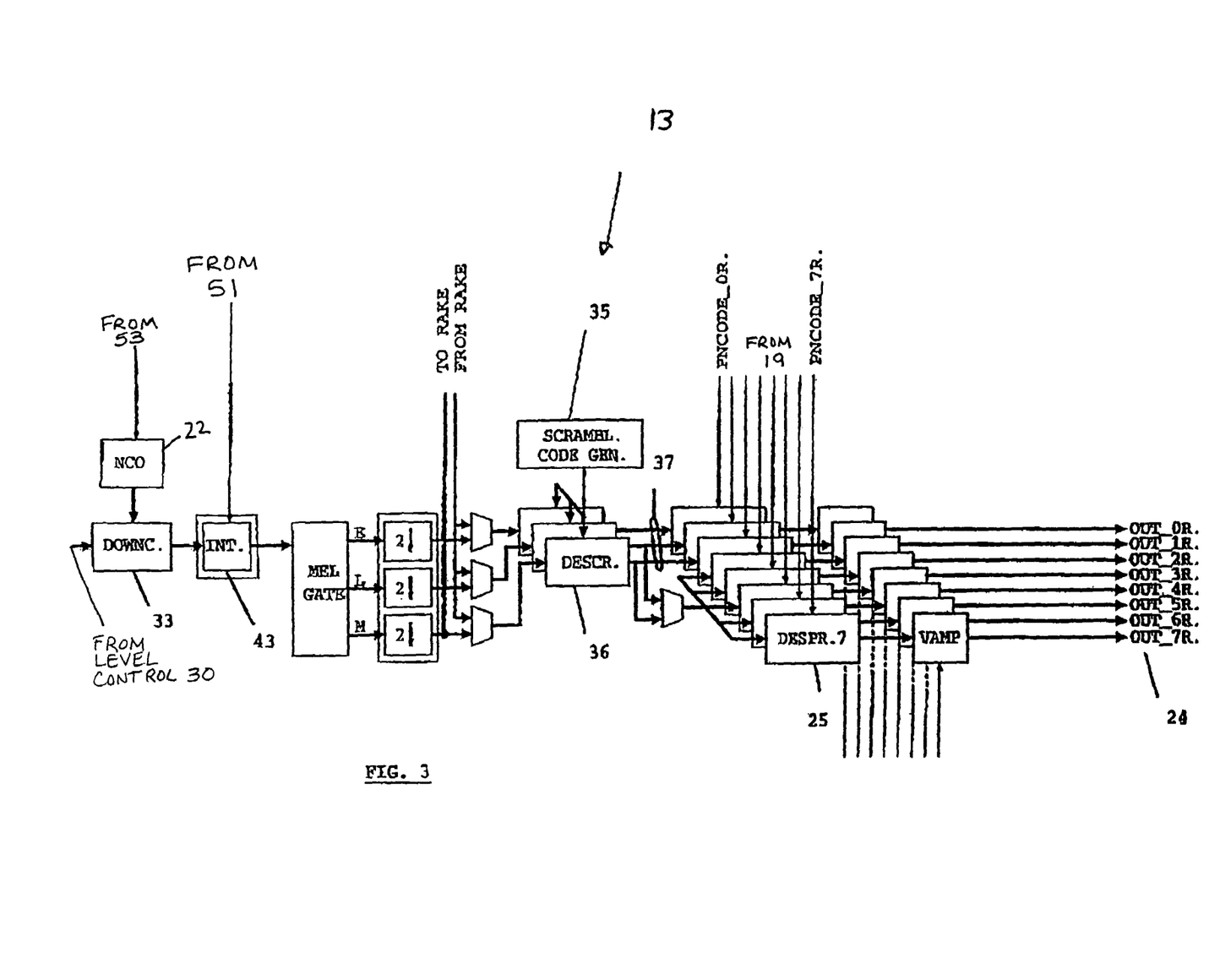
FIG. 3 draws the architecture of an "R" tracking unit.

The baseband receiver architecture 1 as shown in FIG. 1 consists of an IF interface 3, a digital downconversion stage 5, a pulse shaping filter 7 (which is bypassed in GPS and GLONASS reception modes), and a number of demodulators 9 containing tracking units. In navigation mode, the tracking units act independently and track different navigation satellites in parallel. In communication mode, one or more slaved tracking units demodulate the communication signal. Slaving is shown in FIG. 2 with the bold arrow from the Rake 11 to all tracking units 13, 15 and 17. A clock factory module (not shown) provides the clock frequencies for the different receiver blocks, and provides the local time reference. Sufficient flexibility is provided to configure the receiver hardware for different navigation systems (GPS and the augmentation systems, GLONASS, Galileo). The differences between these navigation systems are reflected in the parameterization of the code generators 19, 21 and 23 (or code RAMs), the chipping rate and the PN code length. A microprocessor 8 has access to the correlation data 24 and the necessary observables. In navigation mode, the microprocessor calculates the navigation solution. For slow data communication, it can also perform the data tracking (see prior art (1)). When the terminal is in data communication mode, the transmitter is used for uplinking data from the terminal. Depending on the data bandwidth needs, one or several channels can be allocated by a single user, in a S-CDMA (Synchronous CDMA) fashion, also referred to as multicode transmission.

The switching rate between data communication and navigation, as well as the duty cycle of each of the modes, is application dependent. For small duty cycles for navigation, multi-code transmission is not required, and several channels (i.e. tracking units) can be switched off in data communication mode.

For some applications, it is required that the data communication is continued during navigation. In this case, at least one tracking unit remains devoted for data demodulation, while the others are switched to e.g. GPS reception.

When the receiver is in data reception mode, several tracking units can be slaved in S-CDMA fashion, according to the required data throughout. This is shown in FIG. 2 with the bold arrow from the Rake 11. The multiple correlators (i.e. despreaders 25 in FIG. 3) required for navigation signal reception are re-used for data reception. When using relatively long PN codes (several thousands of chips per sequence), combined with S-CDMA, relatively high data rates are achievable, while still a high processing gain (over 30 dB) is preserved. For multiplexing different users for the data communication link, a QS/S-CDMA (Quasi Synchronous/S-CDMA) is proposed. This is a variant on a CDMA multiplexing scheme from ESTEC, which allows to stack a high number of users in a limited bandwidth, without the drawback of excessive MAI.

When continuous positioning is required, this QS/S-CDMA scheme allows burst data communication without re-acquisition of the navigation satellite signals. Re-acquisition is avoided because the freewheeling time during the data reception and transmission bursts is small. It is small because of the multicode transmission. E.g. with a 12 channel receiver, 12 QPSK/CDMA channels can be packed on top of each other. So we make full use of the multiple channel capability of the receiver.

An alternative for multi-code transmission is as follows: a symbol mapping of n-bit symbols onto $2^n$ codes is performed. Only 1 out of $2^n$ PN codes is then on air instantaneously. This reduces the number of PN-codes which are jointly in the air. On the receive side, a plurality of correlators (i.e. despreaders 25 in FIG. 3) is present, as they are reconfigured correlators from the navigation reception mode.

The acquisition time for both the navigation signal reception and the data reception is strongly reduced through the use of a programmable matched filter in the aquisition block 4 of FIG. 1. Dwelling over multiple symbols is supported, in order to reduce the variance of the acquisition result.

A baseband IC, called CDMAx(TM), which combines GPS, GLONASS and GNSS-2 reception together with satellite-based data communication has been realized in a 0.35 micron CMOS technology.

Architectural requirements to fulfil the needs for navigation signal reception:

This mode allows tracking of a plurality of channels of GPS, GLONASS and Galileo, the European GNASS-2 implementation. GPS is in fact also included in Galileo, as the compatibility of GNSS-2 with GPS is mandatory.

The demodulator architecture of FIG. 3 is suited for GNSS-2 and GPS reception. The feasibility of this receiver structure for GLONASS reception is assured as follows: due to the FDM requirement of GLONASS (different satellites spaced 0.5625 MHz), a large portion of the GLONASS band is sampled at once. Complex downconversion to baseband for every GLONASS band is realized by separate parallel downconverters, which are in the tracking units.

Main system parameters for GPS, GLONASS and Galileo are given in Table 1. The data for Galileo are TBC (To Be Confirmed), as the standardization of this system is to date not yet finalized.

TABLE 1

Main navigation system parameters

|  | GPS CA | GLONASS CA | Galileo (TBC) |
| --- | --- | --- | --- |
| SV Muxing | CDMA | FDMA | CDMA/FDMA |
| Chip Rate | 1.023 Mchips/s | 511 kchips/s | 4 Mchips/s |
| PN Length | 1,023 | 511 | 1,023 |
| Pulse Shaping | — | — | RRC 0.2 |

The complex incoming band is downconverted by a common NCO 2 (see FIG. 1). The Pulse Shaping filter 7 (see FIG. 1) performs the pulse shaping for GNSS-2 (required roll-off: 0.2 (TBD)), and acts as an optional lowpass filter for GPS and GLONASS. This means that the pulse definition filter for GNSS-2 (Galileo) is common for all the channels being tracked. The optionally filtered signal is then fed into a number of parallel tracking units. Each tracking unit performs carrier and chip phase tracking separately. Classical GPS tracking units work with software tracking. With the CDMAx(TM), hardware tracking loops are used, but the raw correlation data will be available for a processor (the on-chip ARM7TDMI).

Figure 4:
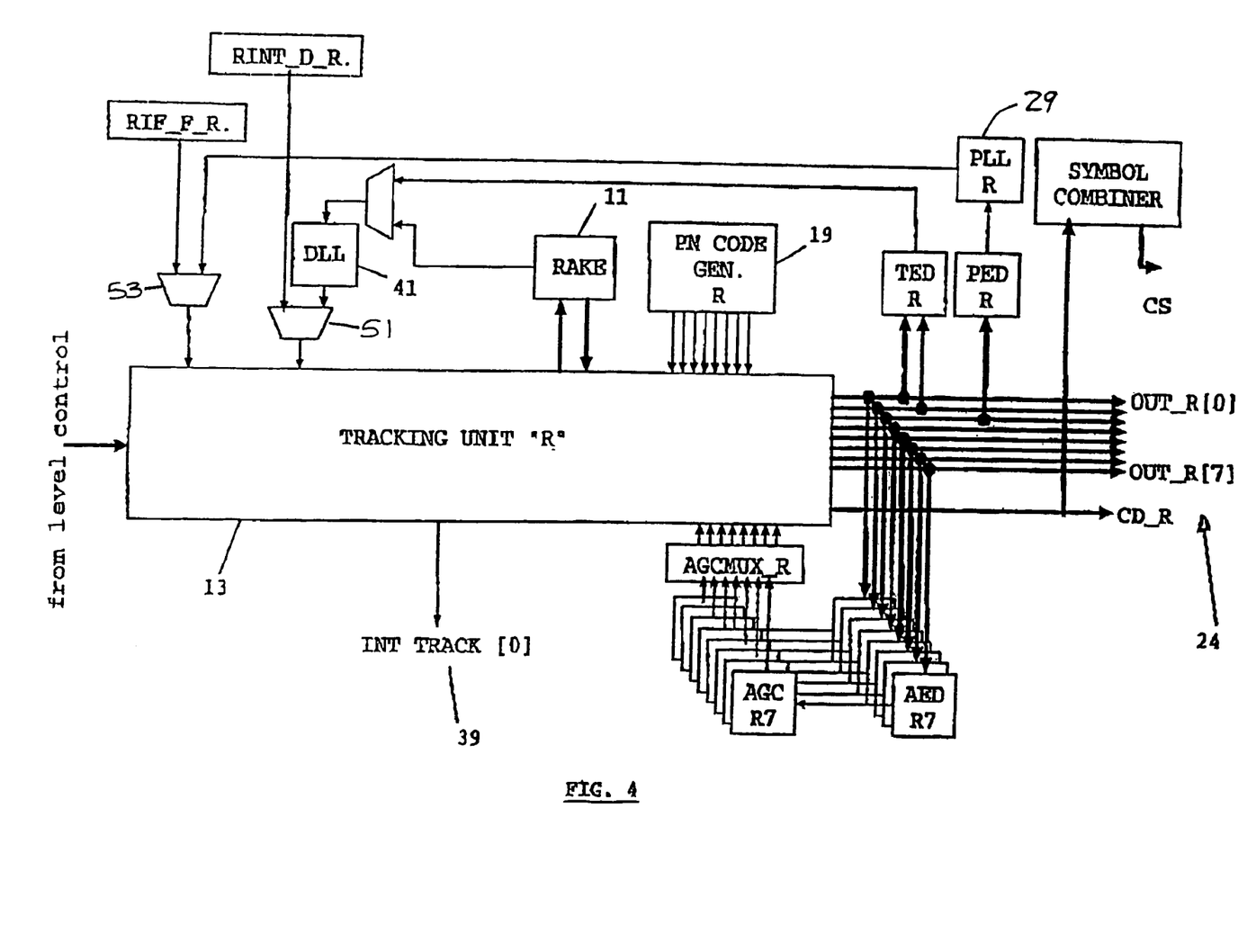
FIG. 4 depicts the details of the connection of an "R" tracking unit to demodulator blocks.
Figure 5:
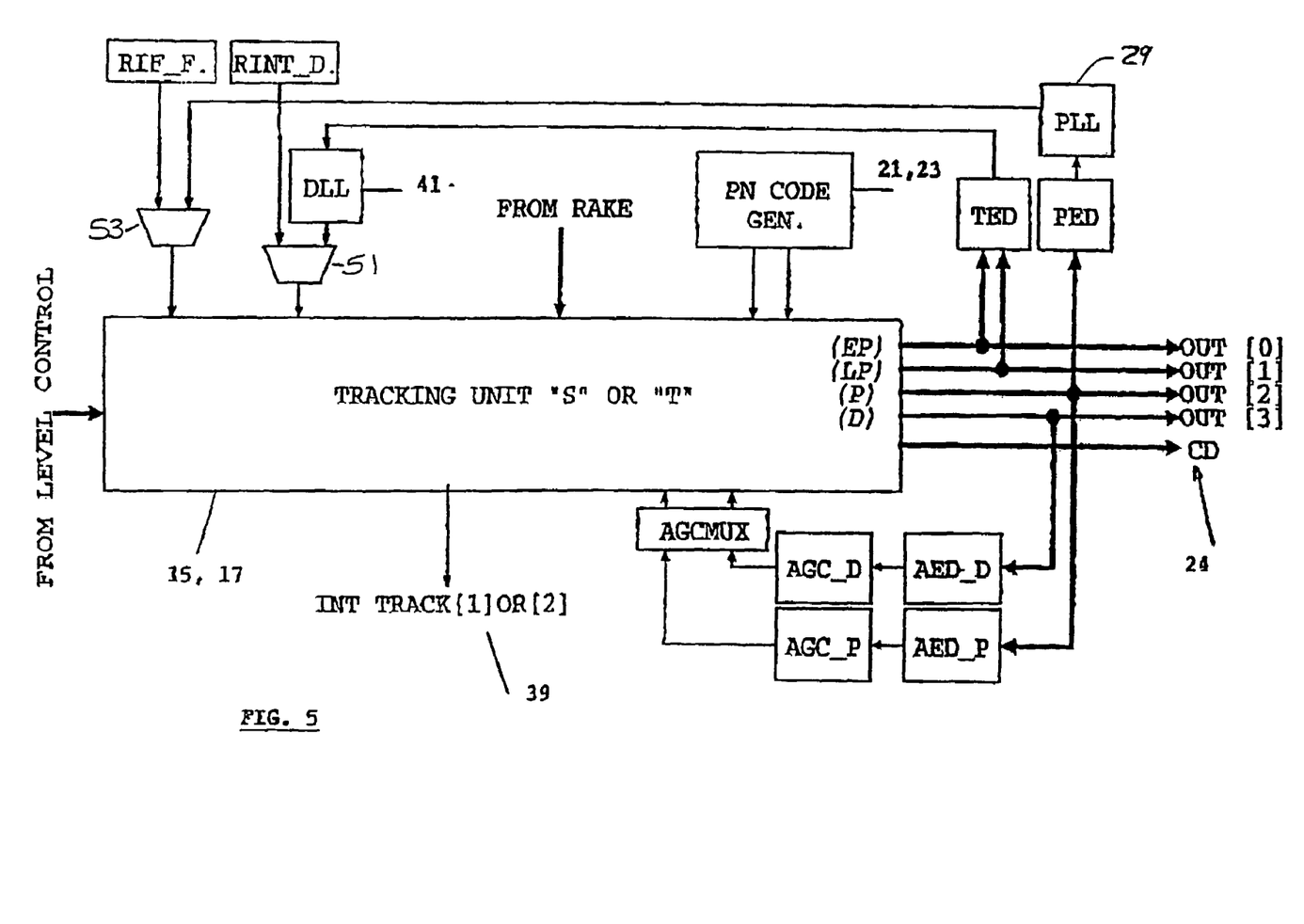
FIG. 5 shows the details of the connection of an "S" or "T" tracking unit to demodulator blocks.

An example of a navigation/communication tracking unit 13 is given in FIGS. 3 and 4. It consists of:
- a complex phase rotator (downconvertor) 33 for downconversion to baseband;
- a programmable Gold code generator 35 (Scrambling code generator), and descrambler 36 (optional);
- a complex E(arly)—M(iddle)—L(ate) despreader and correlator 25 acting on signals 37;
- a PLL 29, acting on the complex Middle correlation, and controlling the phase rotator;
- a DLL 41, acting on the E-M-L correlations, and controlling the interpolator 43.

FIG. 2 shows a demodulator 10 with 3 tracking units 13, 15 and 17, respectively labeled R, S and T. The loops acting on these tracking units are also shown. The 3 tracking units are acting independently if they are configured for baseband GPS reception. These tracking units are slaved for the reception of data for the reception of multi-code transmission data or symbol-mapped data. In an implementation for dual base station or satellite diversity, there are two demodulators (9, see FIG. 1). A receiver using two of the above demodulators can hence track 6 navigation satellites simultaneously.

The chip phase acquisition of a tracking unit can be done in 2 ways:
- sliding correlation, by cycling through the sequence. A speed-up is possible by using the E-M-L correlators 37 (cfr. U.S. Pat. No. 5,872,810);
- by using the Matched Filter (in acquisition block 4 of FIG. 1) on the chip. The PN codes of length 1,023 can be investigated using the Matched Filter for consecutive PN-code portions.

When tracking, each tracking unit generates an interrupt IntTrack(i) 39, with i the tracking unit number, each time an integration period is finalized. Such an interrupt flags a status register that is accessible for the processor 8, together with the complex E-M-L correlation values (it is not feasible to input an interrupt to the processor for every channel). Any time the status register changes, an interrupt is given to the processor.

In order to enable the processor to calculate the navigation solution, a number of observables are optionally accessible. These observables are dumped in registers on the assertion of the observables Measurement Strobe. This strobe is generated by the clock factory, and is common for all tracking units. The strobe is also an interrupt for the processor. Typical strobe frequencies are between 1 and 50 Hz. This is important for the counter sizing in the clock factory.

The following observables are accessible (memory map and synchronization requirements):
- for "standard" precision: The number of integration periods, the code chip number, and the chip fraction (given the interpolator approach, the chip fraction will be given by the instantaneous interpolator setting). These values allow to calculate the pseudo-ranges;
- for higher precision, additionally: The carrier cycle count, and the carrier cycle phase.

An example of a switching procedure between navigation and communication on the hardware of FIG. 2 is given below:
1. The terminal is operating in communication mode (e.g. UMTS/FDD);
2. When an emergency situation occurs, a special button is pushed;
3. The processor 8 (e.g. ARM) reconfigures the receiver into parallel tracking units, with the proper parameterization (via lines 44) for e.g. GPS (CA codes of length 1023, loop bandwidths, . . . );
4. The ARM programs the matched filter with the PN code of the satellite it wants to acquire first. Code phase acquisition is performed first, possible with a dwell;
5. The matched filter initializes the tracking units consecutively. On a dump signal, the correlators in the tracking units produce the correlation values which are the raw input for calculation of the pseudo-ranges;
6. The ARM switches to navigation calculation and provides the position fix;
7. The ARM reconfigures the terminal back in UMTS/FDD mode;
8. The terminal accesses the UMTS/FDD network;
9. The 911 service is automatically called and the ID and the position are transmitted.

I claim:

1. An apparatus for performing spread spectrum-based communication and navigation, the apparatus comprising:
   a receiver configured to receive spread spectrum-based communication signals and satellite navigation signals from a wireless communication channel, the receiver having a plurality of programmable tracking units; and a processor in communication with the receiver to control the apparatus, wherein the tracking units are programmable in a navigation mode to act independently to receive and process the satellite navigation signals or in a communication mode to receive and process the spread spectrum-based communication signals, wherein each programmable tracking unit is assigned to receive one of the wirelessly communicated spread spectrum-based communication signals or satellite navigation signals, and wherein the processor is arranged to control the reconfiguration of at least one of the plurality of tracking units from the navigation mode to the communication mode and vice versa, and wherein at least one of the plurality of programmable tracking units comprises:

a downconverter receiving a controllable carrier frequency signal;

a descrambler receiving the downconverted signal and producing descrambled signals;

a programmable scrambling code generator receivably connected to the descrambler; and a plurality of despreaders receiving the descrambled signals.

2. The apparatus of claim 1, wherein the spread spectrum-based communication signals are W-CDMA signals.

3. The apparatus of claim 2, wherein the W-CDMA signals are selected from the group comprising UMTS/FDD, UMTS/TDD, CDMA2000 and SUMTS.

4. The apparatus of claim 1, wherein the navigation signals are selected from the group consisting of Galileo signals, GPS signals and GLONASS signals.

5. An apparatus for performing spread spectrum-based communication and navigation, the apparatus comprising:

a receiver configured to receive spread spectrum-based communication signals and satellite navigation signals from a wireless communication channel, the receiver having a plurality of programmable tracking units; and a processor in communication with the receiver to control the apparatus, wherein the tracking units are programmable in a navigation mode to act independently to receive and process the satellite navigation signals or in a communication mode to receive and process the spread spectrum-based communication signals, wherein each programmable tracking unit is assigned to receive one of the wirelessly communicated spread spectrum-based communication signals or satellite navigation signals, and wherein the processor is arranged to control the reconfiguration of at least one of the plurality of tracking units from the navigation mode to the communication mode and vice versa, and wherein at the same time a first set of the plurality of programmable tracking units is programmed in navigation mode and a second set of the plurality of programmable tracking units is programmed in communication mode.

6. A method for performing spread spectrum-based communication and navigation with a single device having a receiver comprising a plurality of programmable tracking units, the method comprising:

operating the device in a communication mode;

reconfiguring the receiver of the device to track navigation signals; acquiring the tracked navigation signals; synchronizing the tracking units;

obtaining correlation data from a set of correlators;

determining pseudo-ranges based on the correlation data;

determining a position fix based on the pseudo-ranges; and reconfiguring the device to the communication mode.

7. The method of claim 6, additionally comprising controlling the acts of the method by a processor.

8. The method of claim 6, wherein only selected ones of the plurality of tracking units are configured in navigation mode, and the communication mode is operated jointly with the navigation mode.

9. The method of claim 6, wherein for the acquisition of the navigation signals, a matched filter that is used for acquisition of a communication signal is re-used.

10. The method of claim 6, wherein the communication mode is realized as:

implementing multi-code transmission via a plurality of spreaders, each spreader producing a multi-code signal; and demodulating the multi-code signal via a plurality of slaved tracking units.

11. The method of claim 6 wherein the communication mode is performed by:

a plurality of spreaders to implement n-bit to $2^n$ PN codes symbol-mapping transmission; and a plurality of slaved tracking units adapted to demodulate the signal from the symbol-mapped transmission.

12. An apparatus for performing spread spectrum-based communication and navigation, the apparatus comprising:

a receiver configured to receive spread spectrum-based communication signals and satellite navigation signals, the receiver having a plurality of programmable tracking units; and a processor in communication with the receiver to control the apparatus, wherein the tracking units are programmable in a navigation mode to receive and process the satellite navigation signals or in a communication mode to receive and process the spread spectrum-based communication signals, and wherein at least one of the plurality of programmable tracking units comprises:

a downconverter receiving a controllable carrier frequency signal;

a descrambler receiving the down-onverted signal and producing descrambled signals;

a programmable scrambling code generator receivably connected to the descrambler; and a plurality of despreaders receiving the descrambled signals.

13. The apparatus of claim 12, wherein the at least one of the plurality of programmable tracking units additionally comprises an interpolator receiving the downconverted signal and outputting an interpolated signal to the descrambler.

14. The apparatus of claim 13, wherein the interpolator is controlled via a delay locked loop (DLL) connected to a second output of the at least one programmable tracking unit.

15. The apparatus of claim 12, wherein the downconverter is controlled via a phase lock loop (PLL) connected to a first output of the at least one programmable tracking unit.

16. The apparatus of claim 12, wherein the at least one of the plurality of programmable tracking units additionally comprises a circuit receiving the downconverted signal and providing an early signal, a middle signal and a late signal.

17. The apparatus of claim 16, wherein the descrambler comprises an early descrambler for the early signal, a middle descrambler for the middle signal, and a late descrambler for the late signal.

18. An apparatus for performing spread spectrum-based communication and navigation, the apparatus comprising:
- a receiver configured to receive spread spectrum-based communication signals and satellite navigation signals, the receiver having a plurality of programmable tracking units; and
- a processor in communication with the receiver to control the apparatus,
- wherein the tracking units are programmable in a navigation mode to receive and process the satellite navigation signals or in a communication mode to receive and process the spread spectrum-based communication signals, and wherein at the same time a first set of the plurality of programmable tracking units is programmed in navigation mode and a second set of the plurality of programmable tracking units is programmed in communication mode.

19. An apparatus for performing spread spectrum-based communication and navigation, the apparatus comprising:
- a receiver configured to receive spread spectrum-based communication signals and satellite navigation signals from a wireless communication channel, the receiver having a plurality of programmable tracking units; and
- a processor in communication with the receiver to control the apparatus,
- wherein the tracking units are programmable in a navigation mode to act independently to receive and process the satellite navigation signals or in a communication mode to receive and process the spread spectrum-based communication signals, wherein each programmable tracking unit is assigned to receive one of the wirelessly communicated spread spectrum-based communication signals or satellite navigation signals, and wherein at least one of the plurality of programmable tracking units comprises:
- a downconverter receiving a controllable carrier frequency signal;
- a descrambler receiving the downconverted signal and producing descrambled signals;
- a programmable scrambling code generator receivably connected to the descrambler; and
- a plurality of despreaders receiving the descrambled signals.

20. An apparatus for performing spread spectrum-based communication and navigation, the apparatus comprising:
- a receiver configured to receive spread spectrum-based communication signals and satellite navigation signals from a wireless communication channel, the receiver having a plurality of programmable tracking units; and
- a processor in communication with the receiver to control the apparatus,
- wherein the tracking units are programmable in a navigation mode to act independently to receive and process the satellite navigation signals or in a communication mode to receive and process the spread spectrum-based communication signals, wherein each programmable tracking unit is assigned to receive one of the wirelessly communicated spread spectrum-based communication signals or satellite navigation signals, and wherein at the same time a first set of the plurality of programmable tracking units is programmed in navigation mode and a second set of the plurality of programmable tracking units is programmed in communication mode.

21. The apparatus of claim 20, wherein the processor is arranged to control the reconfiguration of at least one of the plurality of tracking units from the navigation mode to the communication mode and vice versa.

22. The apparatus of claim 20, wherein at least one of the plurality of programmable tracking units comprises:
- a downconverter receiving a controllable carrier frequency signal;
- a descrambler receiving the downconverted signal and producing descrambled signals;
- a programmable scrambling code generator receivably connected to the descrambler; and
- a plurality of despreaders receiving the descrambled signals.

23. The apparatus of claim 20, wherein the spread spectrum-based communication signals are W-CDMA signals.

24. The apparatus of claim 23, wherein the W-CDMA signals are selected from the group comprising UMTS/FDD, UMTS/TDD, CDMA2000 and S-UMTS.

25. The apparatus of claim 20, wherein the navigation signals are selected from the group consisting of Galileo signals, GPS signals and GLONASS signals.

* * * * *

UNITED STATES PATENT AND TRADEMARK OFFICE
CERTIFICATE OF CORRECTION

PATENT NO. : 7,372,888 B1  
APPLICATION NO. : 09/568599  
DATED : May 13, 2008  
INVENTOR(S) : Philips It is certified that error appears in the above-identified patent and that said Letters Patent is hereby corrected as shown below:

On the title page, in item (56), under "Other Publications", in column 2, line 1, delete "Liimit" and insert -- Limit --, therefor.

In column 7, line 31, in Claim 3, delete "SUMTS." and insert -- S-UMTS. --, therefor.

In column 8, line 46, in Claim 12, delete "down-onverted" and insert -- downconverted --, therefor.

Signed and Sealed this

Twenty-sixth Day of August, 2008

JON W. DUDAS  
*Director of the United States Patent and Trademark Office*